United States Patent [19]

Dobbert

[11] 3,728,773
[45] Apr. 24, 1973

[54] CLIPPING APPARATUS

[75] Inventor: Arnold E. Dobbert, Fremont, Calif.

[73] Assignee: Rheem Manufacturing Company, New York, N.Y.

[22] Filed: Mar. 24, 1971

[21] Appl. No.: 127,495

[52] U.S. Cl. .............................................. 29/243.57
[51] Int. Cl. ............................................. B23p 11/00
[58] Field of Search ...................... 29/208 D, 243.57; 92/13, 13.8; 30/180, 228; 100/14, 30; 53/138 A

[56] References Cited

UNITED STATES PATENTS

| 951,513 | 3/1910 | Rohrbacher | 92/13 |
| 3,131,398 | 5/1964 | Gohring | 29/243.57 |
| 3,543,378 | 12/1970 | Klenz | 29/243.57 |

*Primary Examiner*—Granville Y. Custer, Jr.
*Assistant Examiner*—J. C. Peters
*Attorney*—Gordon Wood

[57] ABSTRACT

Clipping apparatus for tying stuffed casings. A gathering and constricting device is arranged to receive the elongated stuffed casing therethrough and, in timed relation with the stuffer, said device constricts the filled casing at space points along the length of the latter and a clipping cylinder associated with said gathering device applies a U-shaped clip around the casing at the constricted point. Two axially spaced apart clips may be applied at one time as disclosed herein.

The clipping cylinder is proiided with a crimp control that permits adjustment of the length of travel of the clipping punch and therefore the degree of pressure applied to the deformed clip. The apparatus is mounted so as to be vertically adjustable in order to suit the height of the stuffed casing being extruded from th stuffer. A novel arrangement of fluid lines supplying power to the various parts of the apparatus is provided so as to minimize the number of lines exposed to danger and fouling. Such arrangement includes a manifold which permits fast connection and disconnection of any line for adjustment and repair of the particular device it serves.

3 Claims, 7 Drawing Figures

INVENTOR
ARNOLD E. DOBBERT
BY Gordon Wood
ATTORNEY

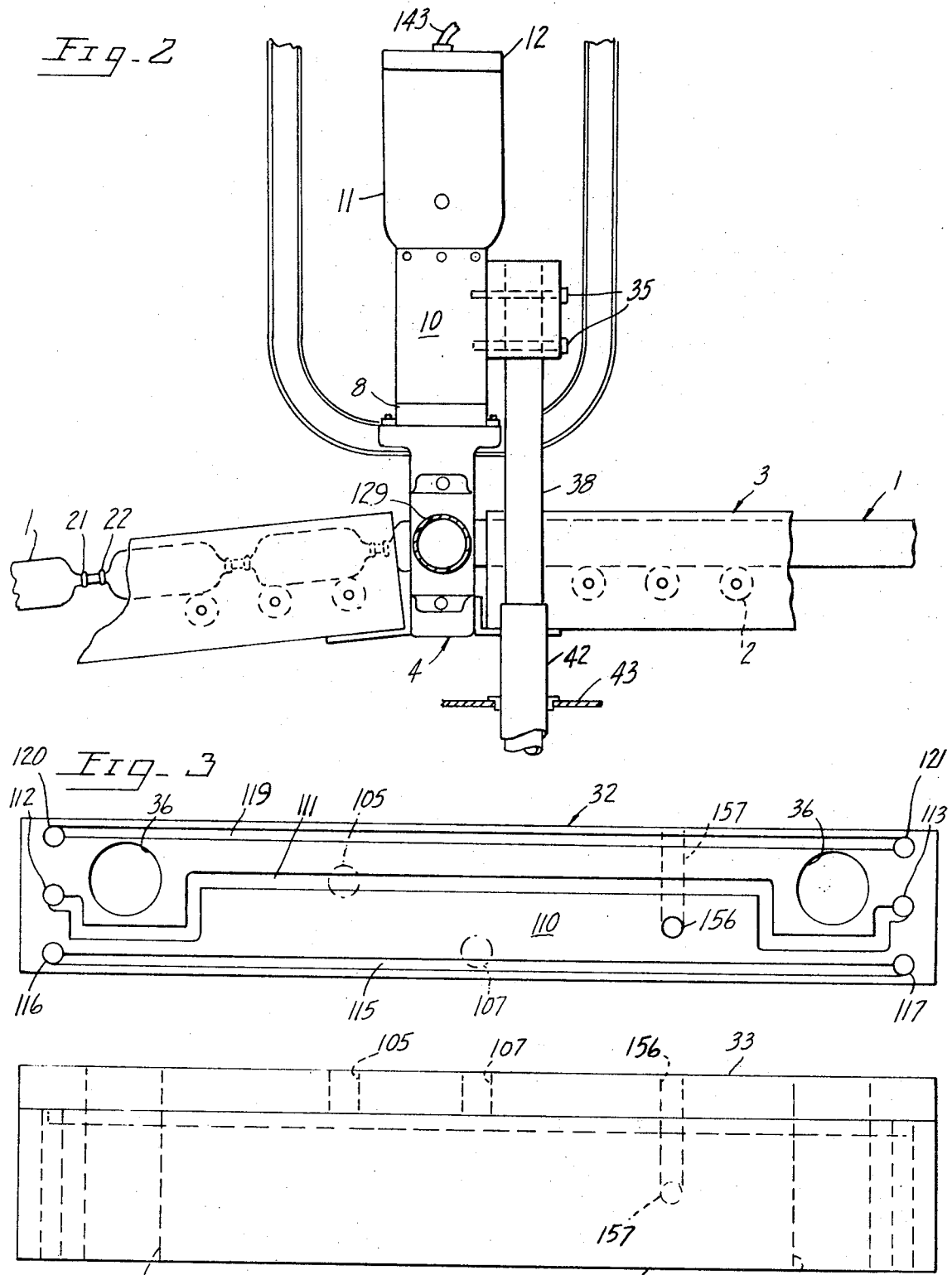

Patented April 24, 1973
3,728,773
3 Sheets-Sheet 3
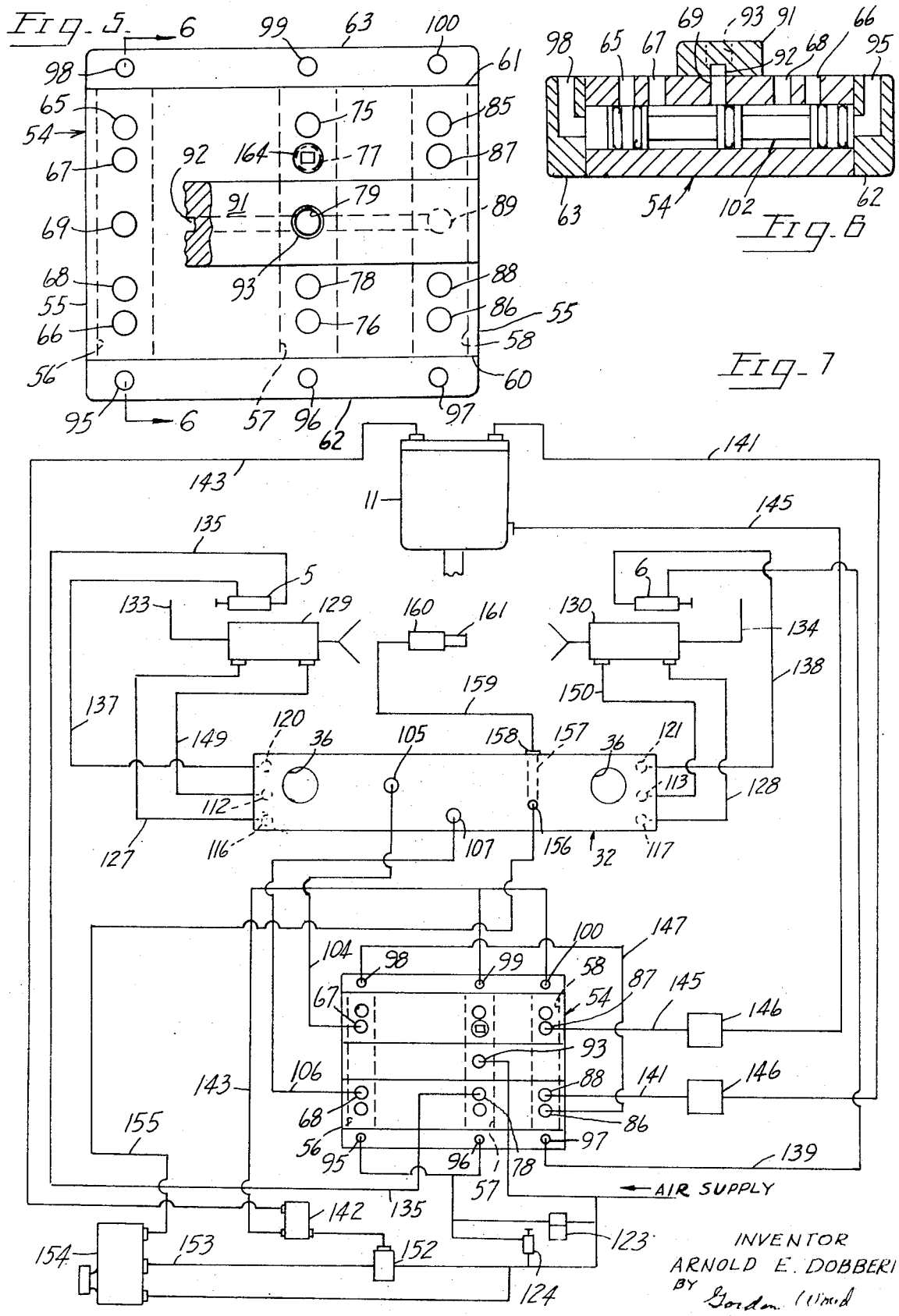
INVENTOR
ARNOLD E. DOBBERI
BY Gordon Wood
ATTORNEY

CLIPPING APPARATUS

This invention relates to a clipping apparatus for applying one or two clips to a stuffed casing and in some respects is similar to the apparatus disclosed in U. S. Pat. No. 3,543,378. In certain respects the present invention is an improvement over said patent and said patent may be referred to for details of construction not disclosed herein. The combination of three four-way valves disclosed herein is an improvement over U. S. Pat. No. 3,546,766, which patent also contains certain details not disclosed herein. The crimp control to be described is in certain respects similar to that disclosed in U. S. Patent application Ser. No. 762,289 filed Sept. 16, 1968 now U. S. Pat. No. 3,583,056.

Demand constantly increases for faster and more automated devices for stuffing and tying sausage and like articles. In U.S. Pat. No. 3,543,378 there is disclosed apparatus for applying a clip or a pair of clips at spaced points along the length of an extruded stuffed sausage casing. Said patented apparatus operates continuously and the various steps performed are sequenced by air valves to obviate any intervention by an operator. In order to attain the higher speeds and more uniform quality of the product desired today it is necessary to further complicate the apparatus and the air system to include additional units and to insure more uniformity of the product. Such additional devices require more air supply conduits which are undesirable from the standpoint of safety since they are subject to damage, interfere with operations surrounding the apparatus, and tend to promote an unsanitary condition since they provide more places for dirt and meat particles to accumulate. By the present invention additional desirable steps and operations are provided in addition to those shown in the cited U.S. Pat. No. 3,543,378 but at the same time the arrangement of the air lines is simplified so as to obviate the above noted undesirable conditions.

Since the various stuffing machines available today have outlets at different distances from the floor level it is desirable to be able to adjust the height of the clipping apparatus so that the apparatus may be employed with any stuffer. Means is provided by the present invention for making such an adjustment and at the same time said means incorporates a manifold employed in the fluid pressure system to simplify the arrangement of air lines and at the same time provide means for supporting the clipping cylinder and the casing gathering and constricting device.

The novel manifold incorporated in the apparatus to be described permits the various air lines to be provided with quick disconnect connections thereby simplifying the removal from the system of the particular device to make repair or replacement of the same. The fact that the present invention lends itself to quick adjustment or repair reduces down time and permits the user to obtain optimum use and efficiency from the apparatus.

The crimp control disclosed in the above noted application Ser. No. 762,289 now U.S. Pat. No. 3,583,056 has some disadvantages in particular situations wherein it is not desirable to have the crimp control rod extending upwardly from the head of the clipping cylinder. By the present invention crimp control means is incorporated in a structure between the clipping cylinder and the gathering and constricting device. At the same time the facility with which the degree of crimping may be controlled is improved since the clipping pressure may be adjusted while the apparatus is in operation.

Other objects and advantages of the present invention will be apparent from the following specification and drawings.

FIG. 2 is an end elevation of the upper portion of the apparatus as taken in a plane through one of the gate closing cylinders as indicated by lines 2—2 in FIG. 1.

FIG. 3 is a top plan view of the manifold block with the cover removed and showing the arrangement of the air carrying grooves.

FIG. 4 is a side elevation of the manifold of FIG. 3.

FIG. 5 is a top plan view of the valve body incorporating three four-way valves with a portion of the cover plate broken away.

FIG. 6 is a cross sectional view through one of the valve bores as taken in a plane indicated by lines 6—6 in FIG. 5.

FIG. 7 is a schematic diagram of the air supply arrangement which incorporates the manifold.

Figure 1:
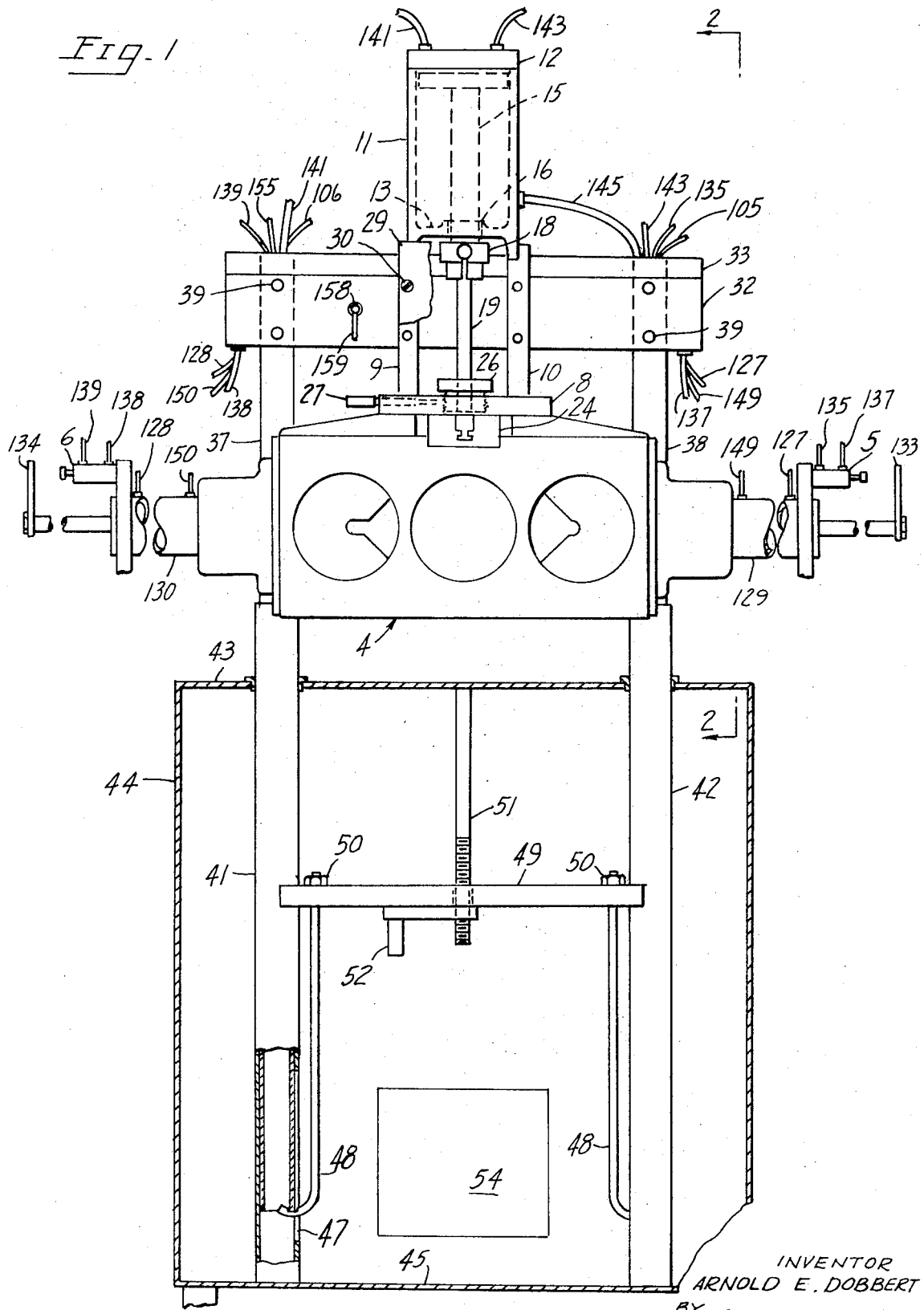
FIG. 1 is a side elevation of the apparatus of the present invention taken from the discharge side of the same and with the downstream clip rail removed for clarity.

Referring first to FIG. 2 the stuffed sausage casing generally designated 1 comes from the stuffer (not shown) and is supported on rollers 2 of a conveyor generally designated 3 for passage through the constricting and gathering device generally designated 4. The details of this device are not described in detail herein and it may be assumed that the same is substantially similar to that disclosed in U. S. Pat. No. 3,543,378 except that in the present case two gate operated valves 5, 6 (FIG. 1) are provided, each being required to be opened by the closing gates of the constricting means before the piston in the clipping cylinder starts its downward stroke. When only one valve is actuated by one gate structure as disclosed in the referenced patent there is a possibility that one gate closes completely before the other thus starting the cylinder on its downstroke before the gathering and restricting steps have been completed. In all other respects the gathering and constricting device indicated at 4 may be considered, for purposes of the present disclosure, to be the same as that shown in U. S. Pat. No. 3,543,378.

Secured to the top of the device 4 is a relatively thick base plate 8 to which are fastened a pair of upwardly extending horizontally spaced apart plates 9, 10. To the upper ends of plates 9, 10 is secured the bottom of the clipping cylinder 11 which is provided with a removable head 12 and a bottom wall 13 (FIG. 1). The piston rod 15 extends through a seal 16 in bottom wall 13 so as to permit the cylinder to be made double acting and to be fluid driven in both directions. It has been found that by employing a spring for the return stroke of the clipping cylinder there is greater likelihood of a breakdown by failure of the spring and, furthermore, the spring return is slower than the return by air pressure.

Secured to the lower end of piston rod 15 is a punch support 18 to which are secured the upper ends of punches 19. As shown in U. S. Pat. No. 3,543,378 the use of two punches permits two clips to be applied to the casing at slightly spaced points along the length of the latter so that after a predetermined number of chubs have been formed the casing may be cut between one pair of clips indicated at 21, 22 in FIG. 2.

The lower ends of the punches 19 are received within the upper end of a clip track (not shown) formed in a block 24 secured to the constricting device 4. The punches 19 pass through a central opening in an adjustment bushing 26 threadedly secured in the plate 8 and adapted to be engaged by the punch support 18 at the end of the down stroke of the punches. A set screw 27 may be employed to hold the bushing 26 in its adjusted position in a manner similar to that shown in the above noted pending application. A removable cover plate 29, a portion of which is shown in FIG. 1, may be secured to the outer edges of support plates 9, 10 by means of screws 30 so that, after the desired adjustment has been made through bushing 26, the crimp control mechanism may be covered up and thereby prevent the entrance of foreign material to the same. It will be noted that the bushing 26 may be rotated to obtain the desired clipping pressure while the apparatus is running. Furthermore it will be noted that the bushing 26 is as close as possible to the working end of the punch. This achieves optimum accuracy in adjustment because cumulative tolerances between the punch end and the piston are not involved.

The apparatus above described is supported as a unit on a rigid elongated horizontally extending manifold generally designated 32 which includes a cover plate 33 secured to the manifold body by means of bolts (not shown) and with a suitable gasket between the manifold and cover. Securement of the above described structure to the manifold 32 may be made by through bolts 35 (FIG. 2) which are threadedly secured within the vertically extending inner edges of plates 9, 10.

The manifold 32 is in turn secured to the upper ends of a pair of pipes 37, 38 which are received within bores 36 (FIG. 3) in manifold 32 and its cover 33. Bolts 39 (FIG. 1) passed horizontally through openings in manifold 32 are threadedly received at their inner ends in the pipes 37, 38 for fixedly securing the manifold to the upper ends of said pipes. The pipes 37, 38 are telescopically received at their lower ends within pipes 41, 42 which extend downwardly through suitable apertures in the top 43 of a cabinet generally designated 44 and are fixedly secured at their lower ends to the bottom 45 of said cabinet.

The pipes 41, 42 are provided adjacent their lower ends with vertically extending elongated slots 47 through which extend the curved lower ends of hanger rods 48 which are secured at their upper ends to a cross piece 49 by means of nuts 50. The cross piece 49 is formed at its ends to be slidable on the peripheries of pipes 41, 42. Fixedly secured at its upper end to the underside of the cabinet top 43 is a threaded rod 51 which extends downwardly through an opening in cross piece 49 and threadedly receives a hand crank 52 which may be turned by an operator to permit the elevation of the clipping apparatus to be adjusted to suit the elevation of the discharge of the stuffer. The slots 47 in pipes 41, 42 also permit the passage therethrough of air lines which are connected to the valve 54 to be subsequently described. As seen in FIG. 1 air lines coming from the interior of the cabinet 44 are conveniently routed through the pipes 37, 38 to the clipping apparatus thus obviating the disadvantages of a haphazard bundle of exterior air lines.

The valve generally designated 54 is shown in FIGS. 5 and 6 and includes a generally rectangular solid valve body 55 which is formed with three bores 56, 57, 58 which extend parallel from one side 60 of the valve body to the opposite side 61. To said sides are secured cover lates 62, 63 respectively for closing the ends of the three bores.

Adjacent the ends of bore 56 the same is provided with exhaust ports 65, 66 and inwardly of said exhaust ports are air outlet ports 67, 68. To one or the other of said air outlet ports air is supplied from inlet 69 which is formed centrally of the length of the bore. Similarily bore 57 is provided with exhaust ports 75, 76, air outlet ports 77, 78 and a central air inlet port 79. In like manner bore 58 is formed with exhaust ports 85, 86, air outlet ports 87, 88 and a central air inlet port 89. Secured to the top of valve body 55 is a cover plate 91 which is formed on its under side with a groove 92 acting as a conduit connecting together the three air inlet ports 69, 79, 89. In this manner air is supplied to the valve through a main inlet 93 coaxial with inlet port 79 of bore 57.

Cover plate 62 of valve 54 is provided with L-shaped passageways 95, 96, 97 communicating with the adjacent ends of bores 56, 57, 58 respectively (FIG. 6). In like manner the cover plate 63 is provided with passageways 98, 99 and 100 communicating with the adjacent ends of bores 56, 57, 58 respectively.

The longitudinal sectional view through bore 56 shown in FIG. 6 is the same for the other two four-way valves of bores 57, 58.

The valve element 102 shown in FIG. 6 is identical to the corresponding valve elements received in bores 57, 58 and details of construction of the same not shown herein can be found in the above noted U. S. Pat. No. 3,546,766. It will be seen, in the position shown, that the valve element 102 has been moved to the right by air pressure introduced through port 98. In this position inlet air from port 69 communicates with air outlet port 67 which, as seen in FIG. 7, is connected by means of line 104 with inlet port 105 of manifold 32. When pressure is removed from port 98 and pressure is applied through port 95 it will be seen that the valve element 102 moves to the right against end plate 63 thereby permitting air from inlet port 69 to communicate with air outlet port 68 which, as seen in FIG. 7, is connected by means of line 106 with the air inlet port 107 of manifold 32.

In the foregoing description of valve 54 and in the following description of manifold 32 the various fittings connecting the air lines are omitted for clarity. It will be understood however that each air line has preferably at least one connection that is connected without the use of threaded elements or the like. Such quick disconnects are presently available and the same are not shown in detail nor are they claimed herein.

The top surface 110 of manifold body 32 (FIG. 3) is provided with a plurality of grooves for forming the desired conduits to which the various air lines are connected. In registration with the air inlet 105 formed in manifold cover 33 is a groove 111 which connects said air inlet 105 with a pair of outlets 112, 113 which terminate at the lower side of manifold body 32. A groove 115 also extends the length of manifold body 32 and communicates with ports 116, 117. In like manner a third groove 119 communicates between outlet ports 120 and 121.

Referring now to the schematic diagram in FIG. 7 and, as noted above, the air supply is connected to port 93 which provides air to the three four-way valves incorporated in valve 54. The air supply is also connected through a solenoid actuated valve 123 and manually actuated valve 124 to ports 95, 96. The apparatus may be started manually by opening valve 124 or, as is preferred, the initiation of the various cycles of the apparatus is made automatically through solenoid actuated valve 123 which in turn is connected to the stuffer so that the steps in the operation of the instant apparatus are in timed relation with the output from the 1stuffer. The air pressure through ports 95, 96 moves both of the four-way valve elements in bores 56, 57 to the left-hand position of FIG. 6 so that air is supplied from outlet 68 through line 106 to the manifold inlet 107 which in turn connects through ports 116, 117 in the manifold and lines 127, 128 so as to move the pistons in gate actuating cylinders 129, 130 to gate closing position. When both gate structures are closed, thus insuring that the stuffed casing is properly constricted and that the die is in its proper position to receive the clips, valves 5, 6 are actuated by arms 133, 134. When valves 5, 6 are thus opened a connection is effected through line 135 from outlet port 78 of valve 54 through said valves 5, 6 and then through line 137, manifold 32, line 138 and line 139 to port 97 in valve 54 thereby shifting the valve element in bore 58 so that air under pressure is supplied through outlet 88 and line 141 to the top of clipping cylinder 11.

At the time the clipping cylinder has completed its stroke, which is predetermined by the position of adjustment bushing 26 (FIG. 1), the pressure in the upper end of cylinder 11 is transferred to control valve 142 through line 143. The construction of valve 142 (see U. S. Pat. No. 3,446,239) is such that upon the application of a predetermined pressure to its piston air pressure is permitted to pass into an outlet line 143 which in turn communicates through port 100 with the bore 58 of valve 54. This results in the valve element being moved to a position closing off port 88 to the air and connecting line 141 with the exhaust port 86. At the same time air under pressure from port 87 is connected through line 145 with the lower end of clipping cylinder 11 thereby returning the punches to their upper positions. Dump valves 146 are provided in lines 141, 145. The exhaust from clipping cylinder 11 is returned through one dump valve 146 to port 88 of valve 54 and the remaining exhaust through port 86 is connected through line 147 with port 98 which causes the valve element in bore 56 to return to its previous position thereby connecting port 67 through line 104 to manifold 32. This permits ports 112, 113 of said manifold to conduct air under pressure through lines 149, 150 to the inner ends of gate cylinders 129, 130 thereby returning the latter to their "gate open" positions. This in turn causes spring return valves 131, 132 to close so that the clipping cylinder 11 cannot start its downstroke until the gates are again closed.

Upon each actuation of the cylinder 11 the application of the predetermined pressure to valve 142 also actuates a valve 152 which in turn sends an impulse through line 153 to a conventional counter 154 which, after a predetermined number of impulses have been counted, connects the air pressure with line 155 communicating with port 156 in manifold 32 (see FIGS. 3, 4). Port 156 communicates through passageway 157 with an outlet port 158 to which a line 159 is connected preferably by a quick disconnect coupling. Said line 159 communicates with the cylinder 160 of a cutoff knife 161 which, as described in U. S. Pat. No. 3,543,378, cuts the casing between a pair of clips 21, 22. In this manner a predetermined number of serially connected chubs may be cut off automatically which is desirable.

The cabinet 44, which may be provided with a door (not shown) permits the storage therein of the various valves, filters, switches and other devices required for the proper operation of air operated equipment. Such devices are thus protected from damage and are free from fouling by dirt and other foreign materials. The case 44 may also be mounted on casters (not shown) so as to be readily movable to the particular stuffer with which it is to be used.

The valve 54 is useful for use in other applications involving clipping operations. For example in certain installations it is desirable to move the clipping device toward and away from the stuffer. In such a case one of the bores 56, 57, 58 may be employed to actuate a cylinder for this purpose. The remaining two valves being employed to carry out the casing constricting and clip applying steps. The construction of valve 54 may therefore be standardized and, in the event certain ports are not required for a particular application, such ports may be closed by means of a plug. For example port 77 communicating with bore 57 is not required in the above described apparatus and the same is closed by plug 164.

I claim:

1. Clipping apparatus comprising:
    a fluid driven cylinder provided with a piston and a piston rod,
    a punch holder carried by the outer end of said rod and an elongated punch secured at one end to said holder and adapted at it other end to engage a clip for deforming the latter on a die,
    adjustable stop means interposed between said cylinder and said die and adapted to be engaged by said punch holder for limiting the travel of said punch toward said die.

2. Apparatus according to claim 1 wherein said stop means comprises a threaded bushing through which said punch passes and which bushing is threadedly secured to a fixed structure.

3. Apparatus according to claim 2 wherein locking means is provided in said structure for holding said bushing in its adjusted position.

* * * * *